Sept. 19, 1933.  E. WITTCOFF  1,927,331
SEAT COVER
Filed Oct. 3, 1932
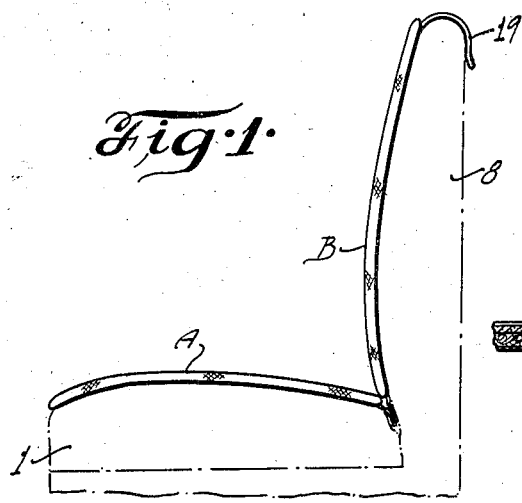
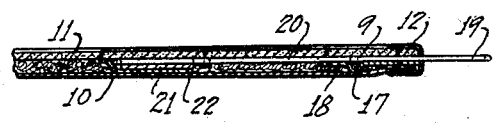
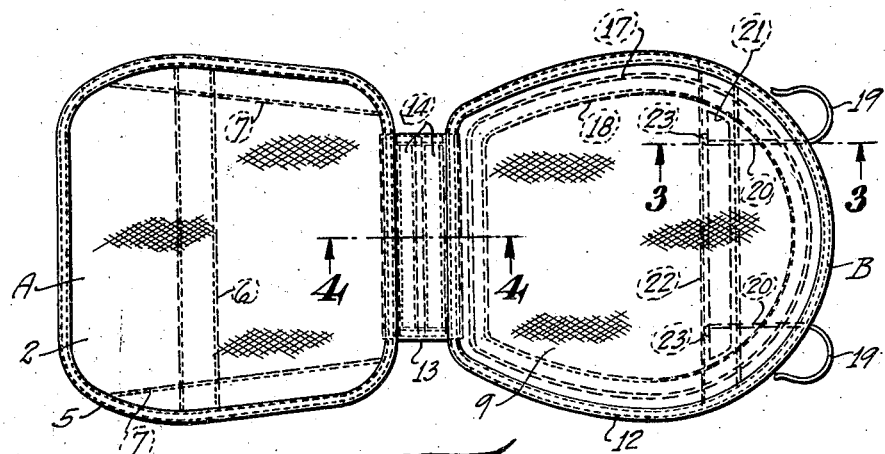
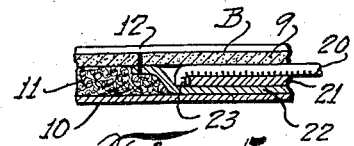
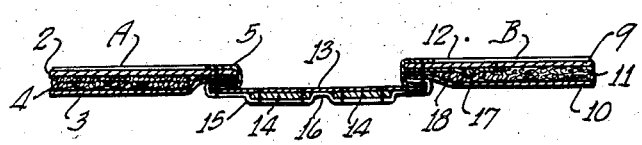
INVENTOR
Edward Wittcoff.
By
ATTORNEY Patented Sept. 19, 1933

1,927,331

UNITED STATES PATENT OFFICE 1,927,331

SEAT COVER

Edward Wittcoff, University City, Mo., assignor to Evr-Klean Seat Pad Company, St. Louis, Mo., a corporation of Missouri Application October 3, 1932. Serial No. 636,038

2 Claims. (Cl. 155—182)

This invention relates generally to seat-covers and has more particular reference to a portable cover for removable disposition on automobile seats, chairs, and the like.

My invention has for its chief object the provision of an efficient, inexpensive, conveniently handle, readily foldable and portable cover for automobile seats, chairs, and the like, the cover including a stiffening frame and means for attaching or mounting the cover on the seat for neatly fitting upon and conforming to the same in a highly attractive and pleasing manner most conducive to long life of the cover and to the satisfaction and comfort of the user thereof.

And with the above and other objects in view, my invention resides in the novel features of form, construction, arrangement, and combination of parts hereinafter described and pointed out in the claims.

In the accompanying drawing,—

Figure 1 is a side elevational view of the seat-cover of my invention as in use on a seat, the latter and its cushions being indicated by dot-dash lines;

Figure 2 is a plan view of the cover in expanded position and removed from the seat;

Figure 3 is a fragmentary sectional view taken approximately along the line 3—3, Figure 2;

Figure 4 is a fragmentary sectional view taken approximately along the line 4—4, Figure 2; and Figure 5 is an enlarged detailed fragmentary sectional view of the cover-portion shown in Figure 3.

Referring now more in detail and by reference characters to the drawing, which illustrates a preferred embodiment of my invention, my present seat-cover includes a seat-member or section A and a back-member or section B hingedly connected, as presently appearing, to the seat-section A, so that the seat and back sections A, B, when the cover is not in use, may be compactly folded one upon the other so as to occupy small space for ready portability, or for use, when unfolded or expanded, to substantially cover the seat and back of an automobile seat or the like.

The seat section A, as its name implies, is adapted, when the cover is in use, for disposition flatwise upon the seat proper or cushion 1 of the automobile seat, chair, or the like, and its body is composed of a preferably three ply mat of approximately rectangular shape or outline, of which the top or wearing ply 2 thereof is preferably constructed of any suitable somewhat stiff yet flexible or pliable material, such as woven matting of fibre, paper, straw, or the like. The bottom ply 3 of the seat-section A is composed of any suitable material, as cloth or leather, and intermediate the bottom ply 3 and the top ply 2 is disposed a suitable cushioning filler or pad 4 of felt, composition rubber, or other suitable material as may best serve the purpose.

At its corners, the seat member A is preferably nicely rounded, as shown, and at their margin, the plies 2, 3, 4, are sewed together and enclosed by a preferably continuous strip of folded-over edging or binding 5 composed of any suitable flexible material, such as leather or its imitations, textile fabric, or the like, and transversely disposed on the bottom face of the seat-section A, is a suitably sewed or secured reinforcing strip 6. Likewise disposed along the opposite sides of the bottom face of the section A, are marginal reinforcing strips 7, the strips 6, 7, being composed of suitable webbing, binding material, or the like, and having their end and outer side margins, respectively, sewed also to and under the adjacent binding 5.

As so constructed, the seat-section A is of necessary stiffness for retaining its shape when in use and is yet sufficiently pliable for readily flexing over the rounded contour of the cushion 1 and for yielding therewith to the body of a person occupying the seat.

The back-section B is adapted, when the cover is in use, for projecting or extending more or less uprightly for substantially covering the front face of the seat-back 8. The section B is also of approximately rectangular shape and in structure is substantially similar to the seat-member A, the section B including a corresponding matting or top wearing-ply 9 and a bottom ply 10 with a cushioning filler 11 therebetween, suitably sewed together and marginally bound or finished by an edging or binding 12.

13 designates a hinge-strip of suitably flexible material preferably similar in structure to that of the bottom plies 3, 10, the hinge-strip 13 having its front and rear margins disposed for overlapping engagement by the adjacent edging material 5, 12, of the sections A, B, respectively. Secured or sewed to the under-face of the hinge strip 13, is a pair of front and rear relatively non-flexible or stiffening members or strips 14 of fibre, webbing, or the like. The strips 14 are disposed transversely, and substantially parallel with the adjacent margins, of the sections A, B, a suitable strap 15 being sewed or attached to the under face of the strips 14 and having its respective end margins folded in and under and suitably secured to the adjacent edgings 5, 12, as best seen in Figure 4.

As so constructed, the hinge strip 13 is restricted by the stiffening members 14 for flexing along the adjacent margins of the section A, B, and also more readily along a line, as 16, intermediate the strips 14, whereby the hinge-strip 13 may, when the cover is disposed on the seat-cushions 1, 8, be flexed or folded and with the aid of the stiffening-members 14 pushed into and disposed for neatly residing at and in the crotch, as may be said, between the cushions 1, 8, for frictionally thereby retaining the sections A, B, snugly and securely at such point upon the cushions 1, 8, as best seen in Figure 1.

And for further enabling the back-section B to uprightly hug, as I may say, the back-cushion 8, the section B is equipped with an interior loop-like frame 17 of suitable resilient stiffening material, as a metal bar, strip of whaling-bone, or the like. The frame 17 in plan preferably closely follows the marginal contour or shape of the body of the back-section B and is disposed preferably between the top-ply 9 and the padding 11, the frame 17 preferably being retained in position by means of a strip 18 of suitable material, as webbing or the like, suitably secured or sewed to the ply 9 for embracing the frame 17, as best seen in Figures 3 and 4.

Preferably, the frame 17 is suitably flexed or formed for conforming to the shape of the cushion 8, whereby, as will be seen, the section B may be pliably stretched on the cushion 8, the margins of the back-section B being caused to closely hug the contour of the cushion 8, producing a highly attractive and neat effect and appearance of the cover when in use.

For further enhancing the attractiveness of the cover and the facility of its use, I prefer to provide a pair of clasping or crook-members 19 for engaging the upper margin of the seat-cushion 8 and having legs or shanks 20 rotarily embedded and extending inwardly between the wearing-ply 9 and the padding 11 adjacent the upper side corners of the section B, as best seen in Figures 1 and 2.

The respective shanks 20 overlie a reinforcing strip or anchor member 21 disposed transversely of the section B adjacent the upper corners thereof, the anchor-member 21 underlying the wearing ply 9 and being retained in position by means of a suitable channel-shaped strip 22 of webbing material or the like secured to the ply 9, as best seen in Figure 3.

At its inner end, each shank 20 terminates in an angular lug 23 adapted, when the hook 19 is turned or disposed for engaging the cushion 8, for engaging the adjacent marginal face of the anchor-strip 21 for retaining the crook 19 securely in position in the section B and preventing longitudinal displacement of the shank 20 therein, as clearly seen in Figure 5.

In use, the seat-cover is draped on the seat to be protected, with the seat-section A disposed approximately flatwise upon the seat-cushion 1 and the back-section B disposed approximately vertically flatwise upon the seat-back 8. The folded hinge-strip 13 is tucked into the crotch between the cushions 1 and 8, as described, and the crooks 19 are rotated so as to be approximately at right-angles to the section B for firmly clasping, as may be said, the upper margin of the cushion 8, as best seen in Figure 1.

When the cover is not in use, however, the crooks 19 may most conveniently be turned sideways so as to lie substantially in the plane of the section B, as best seen in Figure 2, whereby the cover may, as has been said, be compactly folded, one section upon the other, so as to occupy small space most conveniently for ready portability or storage purposes.

My new seat cover is simple in structure, may be inexpensively manufactured, is quite durable, is readily handled, may be conveniently and with facility applied as a protection to an automobile seat or the like, when so applied presents a highly attractive, neat, and pleasing appearance, and is efficient in the performance of its intended functions.

It will be understood that changes and modifications in the form, construction, arrangement and combination of the several parts of the cover may be made and substituted for those herein shown and described without departing from the nature and principle of my invention.

Having thus described my invention, what I claim and desire to secure by Letters Patents is,—

1. In a seat-cover, a section comprising overlying flexible plies marginally secured together, a bendable loop-like section-shaping frame disposed intermediate, and adjacent the margin of, the plies, a pair of spaced seat-clasping members having shanks rotarily embedded and extending inwardly between said plies, an anchor-strip disposed transversely of, and fixed intermediate the plies to, the section, and lugs on the shanks for engaging the anchor-strip for retaining the clasping-members in operative relation to the section.

2. In a seat-cover, a section comprising overlying flexible plies marginally secured together, a bendable loop-like section-shaping frame disposed intermediate, and adjacent the margin of, the plies, a pair of spaced seat-clasping members having shanks rotarily embedded and extending inwardly between said plies, an anchor-member disposed transversely of the section intermediate the plies, a channel-shaped strip of webbing also disposed intermediate and fixed to the plies for securing the anchoring-member in place, and lugs on said shanks for engaging the anchoring-member for retaining the clasping-members in operative relation to the section.

EDWARD WITTCOFF.